United States Patent [19]

Kameda

[11] Patent Number: 5,303,150
[45] Date of Patent: Apr. 12, 1994

[54] WILD-CARD WORD REPLACEMENT SYSTEM USING A WORD DICTIONARY

[75] Inventor: Masayuki Kameda, Yokohama, Japan

[73] Assignee: Ricoh Company, Ltd., Tokyo, Japan

[21] Appl. No.: 626,444

[22] Filed: Dec. 12, 1990

[30] Foreign Application Priority Data

Dec. 15, 1989 [JP] Japan .................. 1-324935

[51] Int. Cl.⁵ ............... G06F 15/00; G06F 15/40
[52] U.S. Cl. ................... 364/419.08; 395/600
[58] Field of Search .............. 364/419; 395/600

[56] References Cited

U.S. PATENT DOCUMENTS

| | | | |
|---|---|---|---|
| 4,674,066 | 6/1987 | Kucera | 364/411 |
| 4,849,898 | 7/1989 | Adi | 364/419 |
| 4,868,750 | 9/1989 | Kucera et al. | 364/419 |
| 5,062,074 | 10/1991 | Kleinberger | 364/900 |

FOREIGN PATENT DOCUMENTS 61-90271 5/1986 Japan .
038078 4/1989 Japan .

OTHER PUBLICATIONS

"APS Text Search and Retrieval Manual", Planning Research Corporation, Feb. 1987, Prepared for USPTO pp. 2.28-2.32.

Primary Examiner—Roy N. Envall, Jr.
Assistant Examiner—Gita D. Shingala
Attorney, Agent, or Firm—Mason, Fenwick & Lawrence

[57] ABSTRACT

A alphabet word input system includes a word dictionary for the object texts written in the alphabet, a search part for searching the word dictionary, and a replacing part for replacing word input using a wild card character for one portion into the character string of the word searched by the search part and therefore input character strings of alphabet words replaced by the replacing part.

9 Claims, 4 Drawing Sheets

| WORD | SYNTACTICAL ELEMENT |
|---|---|
| be | v |
| bear | v/n |
| beat | v |
| beautiful | a |
| beautify | v |
| beautification | n |
| beauty | n |
| beaver | n |

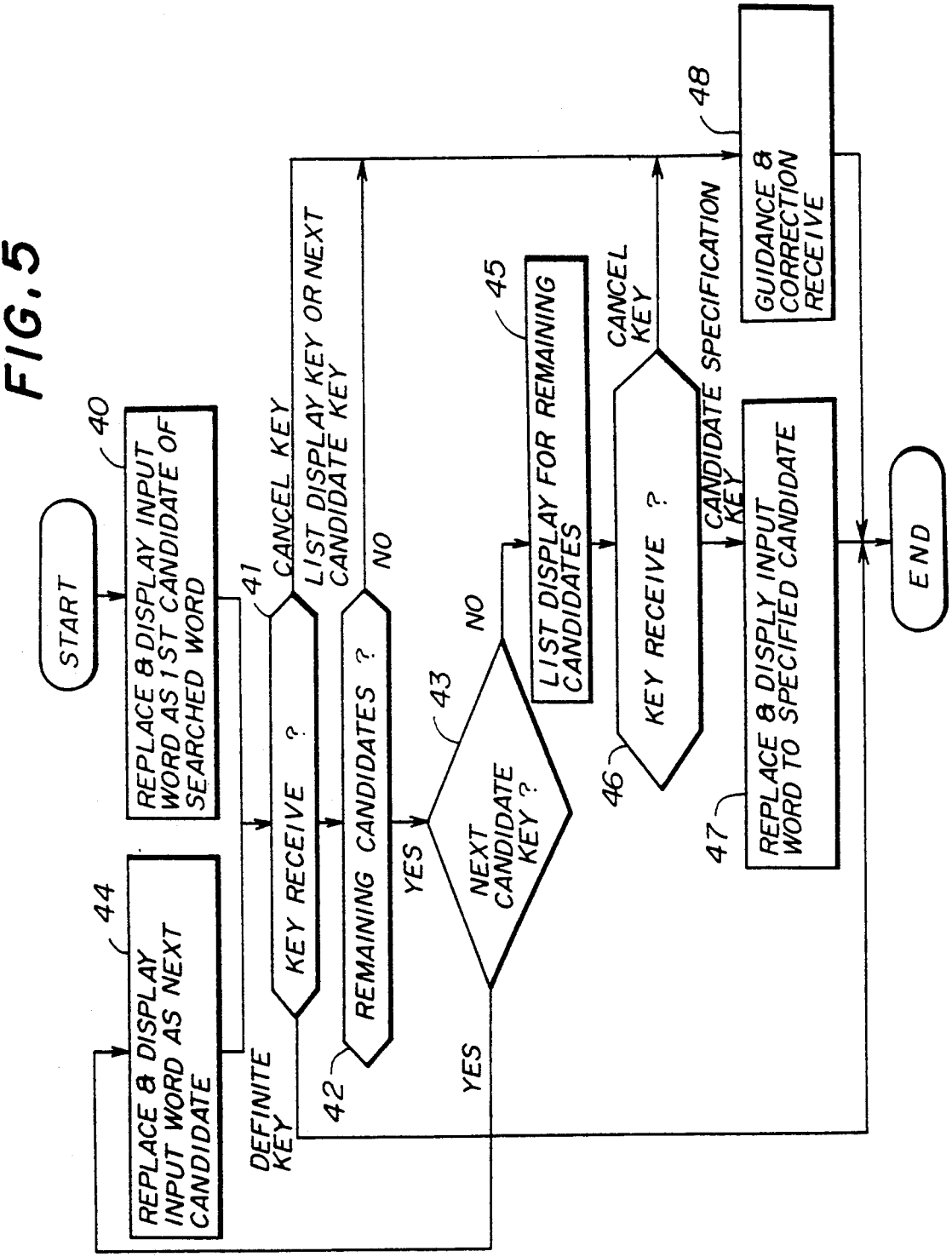

WILD-CARD WORD REPLACEMENT SYSTEM USING A WORD DICTIONARY

BACKGROUND OF THE INVENTION

The present invention relates to a system for the input of words using the alphabet and which is capable of application to the input portion of word processors for which the input of texts written in the alphabet is necessary, and machine translation systems that translate texts written in the alphabet into texts in other languages.

The input of words in the alphabet is fundamental to the input of texts written in the alphabet. There is a known technology that uses the electronic dictionary described below for the input of texts written in the alphabet.

Practically all English language word processing softwares such as "Word Perfect" and "Wordstar" are provided with a spelling check dictionary and a function of checking the spelling. There are also many word processing softwares which have a spelling correction function. In a Unix computer operating system, a "spell" command which is a spelling correction function is provided as standard.

In addition, in the English-Japanese word processor "duet" of the Just System Co., Ltd. which handles both the Japanese and English languages, there is an English text spelling check function. There is also a function of displaying the contents of both the Japanese language dictionary and the English language dictionary.

In machine translation systems as well, a machine translation dictionary is used to perform a spelling check after a English text OCR (optical character reader) which is an auxiliary English word input means has read the text. This is described in the pamphlet for the "DUET-E/J" English-to-Japanese machine translation system of the Sharp Co. In addition, there is a machine translation system which is provided with a dictionary for the user's reference independently of the dictionary for machine translation. This is described in the pamphlet for the "HICATS" machine translation system of Hitachi Corp.

In addition, with the above described "DUET-E/J" English-to-Japanese machine translation system, it is possible for the user to specify the type of syntactical element (or grammatical category) of the English word. This is a kind of support function for the system by the user specifying the type of the syntactical element of the word and thus solves the problem of the type of syntactical element being ambiguous when a word has two or more syntactical elements. In this method, for example n xxx is interpreted as xxx of noun ("n—" means noun).

With the Unix, when the character string for search file name is specified for the file information retrieval command such as the 'ls' command, and search character string in file is specified for the commands such as 'grep' and the like, it is possible for the expression for the arbitrary characters (string) to include the following 'wild card' characters.

*: an arbitrary character string
?: an arbitrary character

When the former file name including a 'wild card' character is specified in 'ls' command, the 'wild card' character can be replaced with the corresponding portion of the existing file name so that there is the effect of abbreviated or shortened input for the file name.

If "ls ab*e" is input, the file names for which the first two characters are "ab" and for which the last character is "e" are searched, for example "abcde" (if existed), and the dictionary information of the searched files are displayed.

In such a conventional technology, when a word in the alphabet is input, it is necessary to use the keyboard to input the entire spelling of the word. This has been extremely inconvenient in view of the input of words for which the spelling is difficult to remember. Moreover, in the UNIX wild card described above, it is possible to shorten the input for file names or search character strings only and thus the range of application of this is limited.

SUMMARY OF THE INVENTION

The present invention has as an object the provision of a alphabet word input system that is novel and in which the problems described above are eliminated.

Another object of the present invention is to provide a alphabet word input system that uses a word dictionary for the object texts written in the alphabet and a search means to search the word dictionary, and which uses a replacing means to replace word input including a wild card character for one portion into the character string of the word searched by said search means and therefore input character strings of alphabet words replaced by said replacing means. According to the present invention, it is possible to use a wild card character for one portion of the word without having to input the entire word in the alphabet and therefore enable shortened input and the input when the spelling of the word is unclear, and those make the input of words more efficient.

Still another object of the present invention is to provide a alphabet word input means that has syntactical element information in said word dictionary, and said search allows an input word with a syntactical element information, separates said syntactical element information from the input word, searches that word dictionary, and discards the searched words where syntactical element informations differ from syntactical element information of said word input. According to the present invention, when there is shortened input and a plural number of candidates for replacement are present, specifying the syntactical element enables a word to be efficiently selected from words having the same root and thus further increase the efficiency of input.

Still another object of the present invention is to provide a alphabet word input system that has a selection means to select a single word when a plural number of words have been searched as candidates for replacement as the result of searching said word dictionary by said replacing means. According to the present invention, it is possible to efficiently select a single word from words that are generally similar and to further increase the efficiency of input.

Yet another objects of the present invention will become clear from the following description, with reference to the appended drawings brief description of the drawings.

BRIEF DESCRIPTION OF THE DRAWINGS

FIG. 5 is a transform flowchart of one portion of the processing steps in FIG. 1.

DESCRIPTION OF THE PREFERRED EMBODIMENTS

The following is a description of preferred embodiments of the present invention, with reference to the appended drawings.

Figures 2, 3:
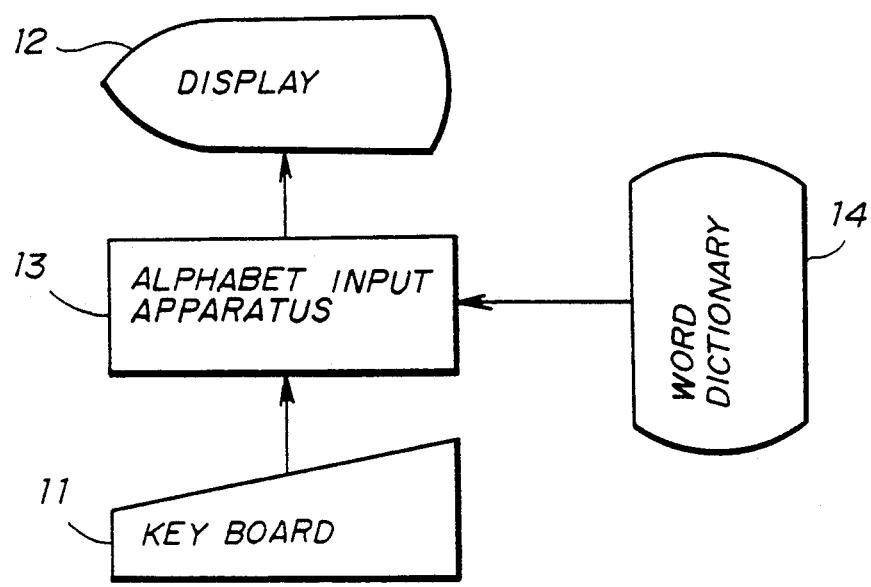
FIG. 2 is an outline configuration figure of a alphabet text processing apparatus.
FIG. 3 is a view describing one portion of the dictionary contents.

First, FIG. 2 is an outline configuration figure of a alphabet text processing apparatus, and a alphabet text processing apparatus 13 is provided with a keyboard 11, a display 12 and a word dictionary 14 for the object alphabet text. In addition, there is also provided a means having a word dictionary search function to search the word dictionary 14, and replace a wild card character inside a word into a suitable character string.

In the present embodiment, "*" and "?" are used as the wild card characters as in the UNIX operating system, and in addition, the character "@" is used to signify "an arbitrary character string of two characters or more" and becomes effective for particularly long words.

The function of the present embodiment is set so as to operate only when a wild card character is included in a character string having blanks before and after it. When a wild card character is used in a sentence as a question mark or as an asterisk, that question mark or asterisk is enclosed in quotation marks or the like. Alternatively, pressing a special key instead of the space bar to delimit words causes the function of the present embodiment to operate if a wild card character is used inside a word, while not pressing the space bar can cause the spelling check function to operate.

Figure 1:
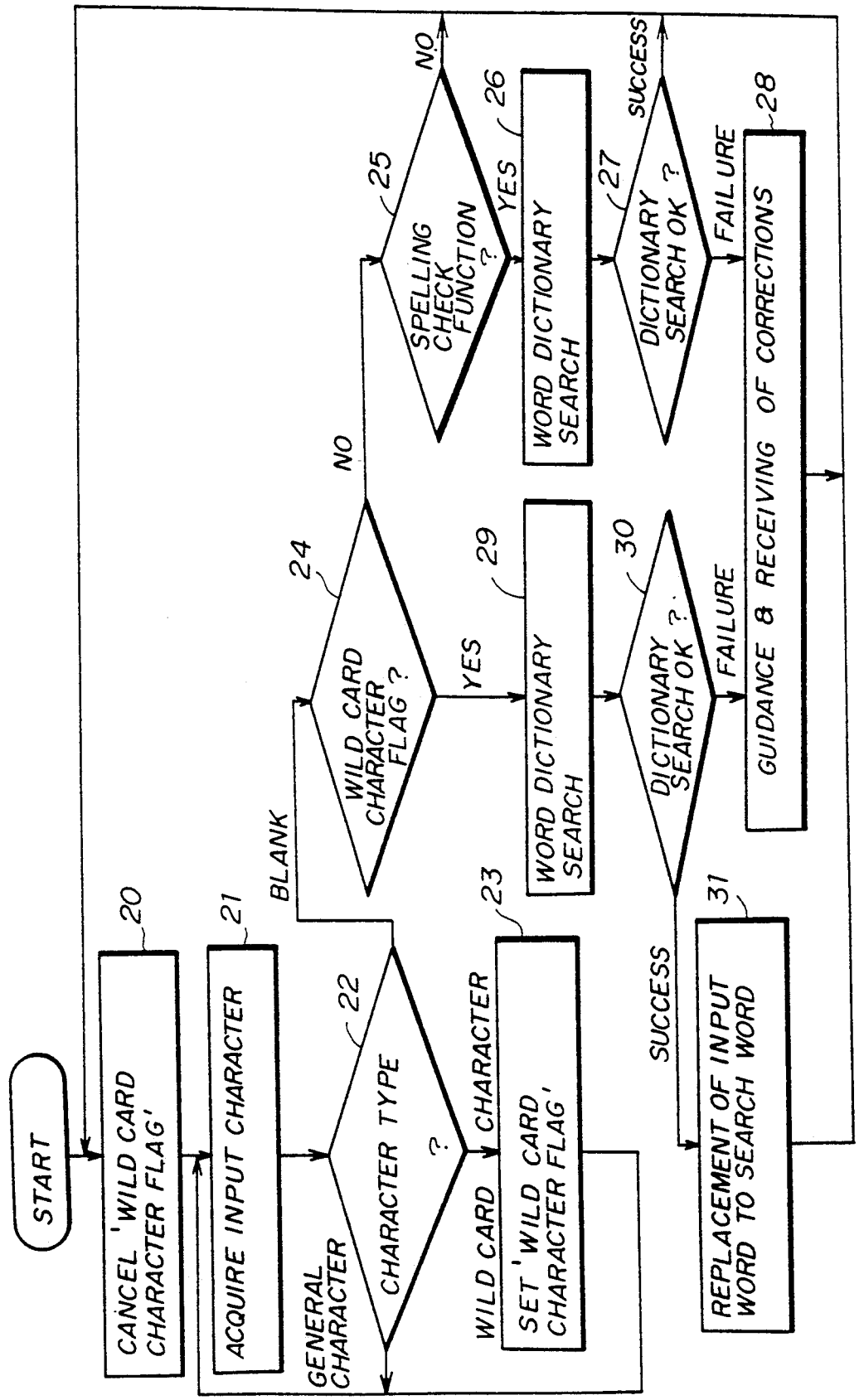
FIG. 1 is a flowchart showing the processing of a first embodiment according to the present invention.

FIG. 1 is a flowchart showing the processing of a first embodiment according to the present invention. First, the input character is obtained (step 21) after initialization so that "wild card character flag" is reset (step 20). If that character type is discriminated in step 22 as an alphabetic character, then there is return to step 21 and if that character is a wild card character, and then "wild card character flag" is set, if that character is space then processing is performed in accordance with the results of judgment (step 24 for whether or not "wild card character present" is set or not. If "wild card character present" is not set, then a judgment is performed for whether or not the alphabet text processing apparatus 13 has the spelling check function or not and if there is the spelling check function, the word dictionary 14 is searched in step 26 and if the search is successful, there is return to step 20 from step 27 and if the search is not successful, the guidance table for search failure is displayed and an correction allows to be made (step 28). If "wild card character present" is set in step 24, then a search for the character string that includes the wild card character is performed (step 24) referred to the word dictionary 14 and if the search is successful the processing proceeds from step 30 to step 31, and the word is made to be the complete spelling of the word, that is, the status where the wild card character inside the input word has been replaced to the search character string. If the search is a failure, then in step 28, the guidance table for search failure is displayed or a correction allows to be made, step 28 or step 31 are executed and there is return to step 20.

For example, if the English word 'beautiful' is intended to be input, then one portion of the word dictionary 14 is as shown in FIG. 3 (however, for the purpose of simplicity of description, other items have been omitted), and so only the input of 'bea*l' enables the replacement to the complete word 'beautiful'. However, when a particularly long word is the object, then it is more definite if '@' is used as the wild card character such as in 'bea@l'. In addition, if only 'bea*' is input, then there is the possibility that words such as 'bear' and 'beat' will be searched and replaced. Thus, the wild card character "*" is generally used for the input of words for which the spelling is unclear, and the wild card character "@" is generally used for the input of words that are long.

In the processing described above, when there are the contents of the word dictionary 14 as shown in FIG. 3, the input of 'bea@' may be replaced by the word 'beauty' that satisfies the same conditions. Such a phenomenon occurs more readily when there are words that have the same root and so the correct word can be selected by specifying the syntactical element. In order to do this, the word dictionary 14 must have syntactical element information appended to each word and the type of syntactical element is to be specified in the input word spelling.

For example, as shown in FIG. 3, syntactical element information such as 'noun', 'verb', 'adjective' and the like are appended as the syntactical element information 'n', 'v', 'a' and so on, and 'syntactical element information' can be added after the input spelling. In the case of the example described above, the term 'bea@—a' is replaced to the word 'beautiful'. This is particularly effective when there are long words ending in 'tion' (noun) or 'eous' (adjective).

Figure 4:
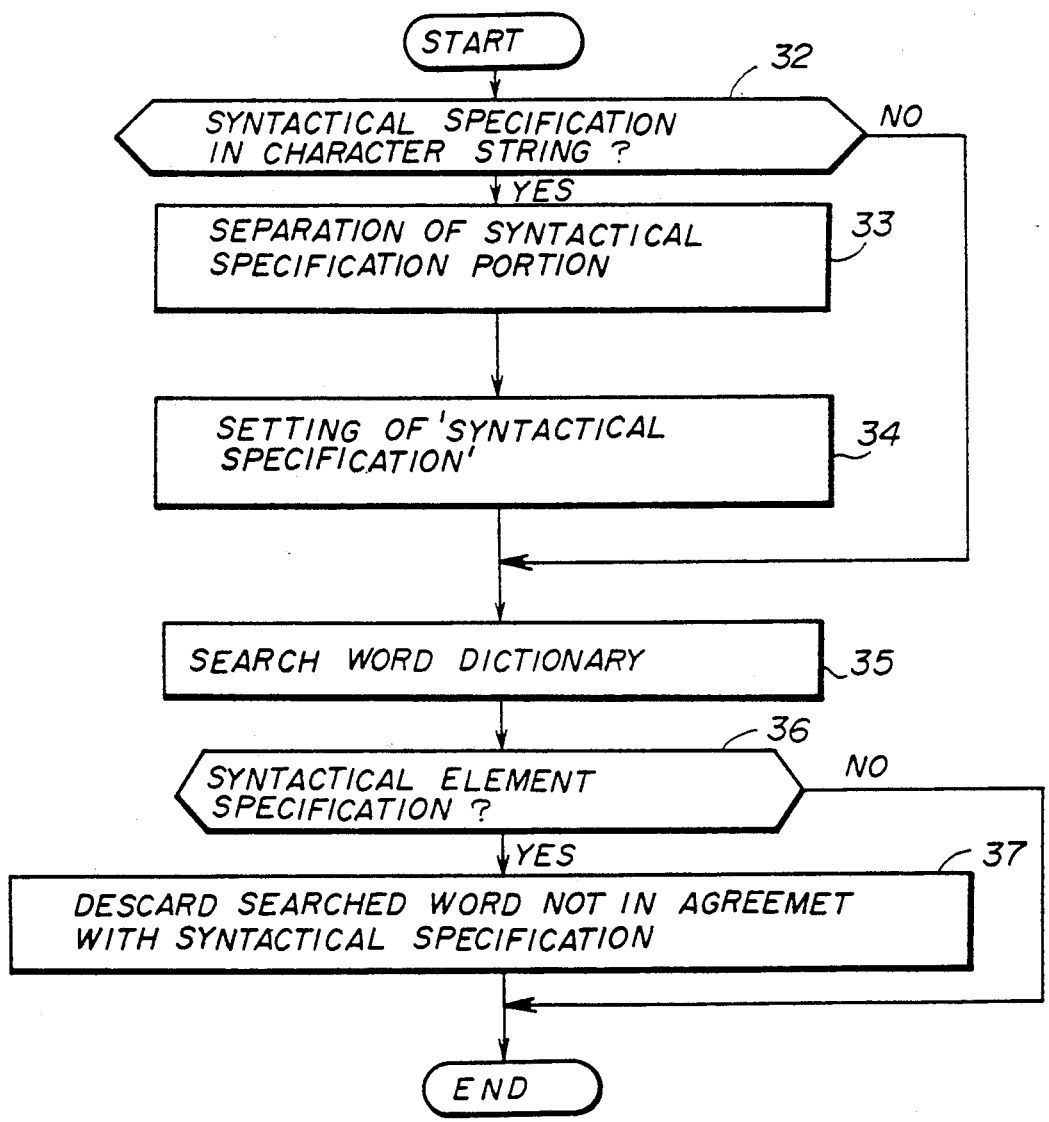
FIG. 4 is a transform flowchart of one portion of the processing steps in FIG. 1.

In this case, instead of the step 29 of FIG. 1, the processing shown in FIG. 4 is executed. In FIG. 4, a judgment is performed in step 32 for whether there is the syntactical element information inside the character string, and only if there is, the syntactical element specification portion is separated from the character string (step 33) and the flag for there being the syntactical element specification is made (step 34).

After this, the word dictionary 14 is searched for the character string (step 35) and only if there is the syntactical element specification (step 36), is discard (step 37) performed for the searched words that are not in agreement with the syntactical element specification set above.

Using the syntactical element information in this manner enables selection from a plural number of candidates but this is limited to this specific phenomena and is not a method for general use. In the case where selection is performed according to a more general method, there can be a candidate selection function such as the selection function from a candidate list or a next candidate selection function such as are provided in kana-kanji conversion. The next candidate selection is to change the candidate wit the next one if a next candidate is required.

For example, if there is the input word 'bea@', then the word candidates can be displayed as shown below.

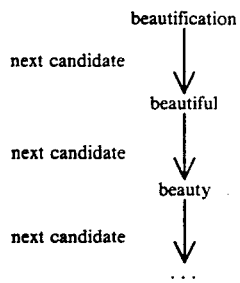

If there is selection from a candidate list, then the display can have numbers (identifiers) appended to the displayed candidates so that the required word can be obtained by specifying that number.

In this case, the replacement processing executes step 31 of FIG. 1 as shown in FIG. 5. First, in step 40, the first candidate word from out of a plural number of words that were searched as including the wild card character is replaced and displayed. Here, if the list display key or the next candidate key is received as the key input of step 41, then a judgment is made in step 42 for the presence of remaining candidates. If there is a remaining candidate, then a judgment is made (step 43) for whether the key received in step 41 is the next candidate key, and if it is the next candidate key, the word input in step 44 is changed into the word of the next candidate.

When it is judged that the list display key was pressed in step 43, a list of the remaining candidates is displayed (step 45) and if the key received in step 46 is the candidate specification key, then the word input in step 47 is replaced to the word of the candidate specified by the candidate specification key and input in the text.

In addition, if the cancel key is received in step 41 or step 46, or if there are no remaining candidates in step 42, then the guidance table is displayed for step 48 and correction allows to be made. In addition, in step 41, if the definite key has been received in step 41, then step 402 ends the processing up to the step 44.

The order of candidates is such that it can be performed for from the longest words when the object of shortened input is because a word is long. In addition, as in the case of kana-kanji conversion, the user's selection conditions and the frequency information of the word are stored in the word dictionary 14 so that a learning function or the like is used so that the order of display of the suitable candidates is suitably performed.

Further, the present invention is not limited to these embodiments, but various variations and modifications may be made without departing from the scope of the present invention.

What is claimed is:

1. An alphabet word input system comprising:
   word dictionary means including first storing means for storing replacement candidates, wherein each candidate is a full-text word made up of alphabet characters, and second storing means for storing syntactical element information about each of said replacement candidates stored in first storing means;
   input means for inputting a wild-card word, said wild-card word including one or more wild card characters, and for inputting syntactical information associated with said wild-card word;
   searching means for searching said input wild-card word in said word dictionary means to find at least one of said replacement candidates, separating said syntactical information from said wild-card word, and discarding replacement candidates that have syntactical elements information that differs from the syntactical information associated with said input wild-card word; and
   replacing means for replacing said input wild-card word with said replacement candidate found by said search means.

2. An alphabet word input system of claim 1, wherein said searching means further comprises selecting means for selecting a replacement candidate when a plural number of candidates are uncovered by said searching means.

3. An alphabet word input system of claim 2, wherein said selecting means successively displays the words searched by said searching means and then selects a replacement candidate to be replaced.

4. An alphabet word input system of claim 2, wherein said selecting means displays a list of the replacement candidates uncovered by said searching means and then selects a replacement candidate from the list.

5. An alphabet word input system of claim 1, wherein said input means accepts wild-card words using a wild card character that signifies an arbitrary character string of two or more characters.

6. A method for inputting an alphabet word, comprising the steps of:
   inputting a wild-card word that includes one or more wild card characters, and has syntactical element information associated with said wild-card word;
   separating said syntactical information from said input wild-card word;
   searching said wild-card word in a word dictionary that includes a first storage area for storing replacement candidates, wherein each candidate is a full-text word made up of alphabet characters;
   discarding replacement candidates that have syntactical element information that differs from the syntactical element information associated with said wild-card word;
   replacing the input wild-card word with said replacement candidate remaining after said discarding step.

7. A method according to claim 6, further comprising a step of selecting a replacement candidate when a plural number of candidates are uncovered by said searching step.

8. A method according to claim 7, wherein said selecting step includes successively displaying said uncovered replacement candidates.

9. A method according to claim 7, wherein said selecting step includes displaying a list of the searched replacement candidates and selecting a candidate to be replaced from the list.

* * * * *